United States Patent [19]

Sanderson

[11] Patent Number: 4,973,528
[45] Date of Patent: Nov. 27, 1990

[54] FUEL CELL GENERATING PLANT

[75] Inventor: Robert A. Sanderson, Wethersfield, Conn.

[73] Assignee: International Fuel Cells Corporation, South Windsor, Conn.

[21] Appl. No.: 521,515

[22] Filed: May 10, 1990

[51] Int. Cl.⁵ .............................. H01M 8/04
[52] U.S. Cl. .................... 429/12; 429/17; 429/34
[58] Field of Search .............. 429/12, 17, 19, 20, 429/13, 34

[56] References Cited

U.S. PATENT DOCUMENTS 3,976,507 8/1976 Bloomfield ............ 429/17
4,041,210 8/1977 Van Dine ............ 429/12 X
4,080,791 3/1978 Nadler et al. ............ 429/12 X
4,657,828 4/1987 Tajima ............ 429/12
4,738,903 4/1990 Garow et al. ............ 429/17
4,838,020 6/1989 Fujitsuka ............ 429/13 X Primary Examiner—Anthony Skapars
Attorney, Agent, or Firm—Edward L. Kochey, Jr.

[57] ABSTRACT

A fuel cell power plant has an auxiliary burner (40) to supplement input to the turbo compressor (22). Gas line 44 to the burner contains a check valve (62) and an accumulator (64) downstream of the check valve. On a temporary power loss the continued gas supply to at least the pilot (52) of the auxiliary burner avoids flame-out and a consequent longer term plant outage.

3 Claims, 1 Drawing Sheet

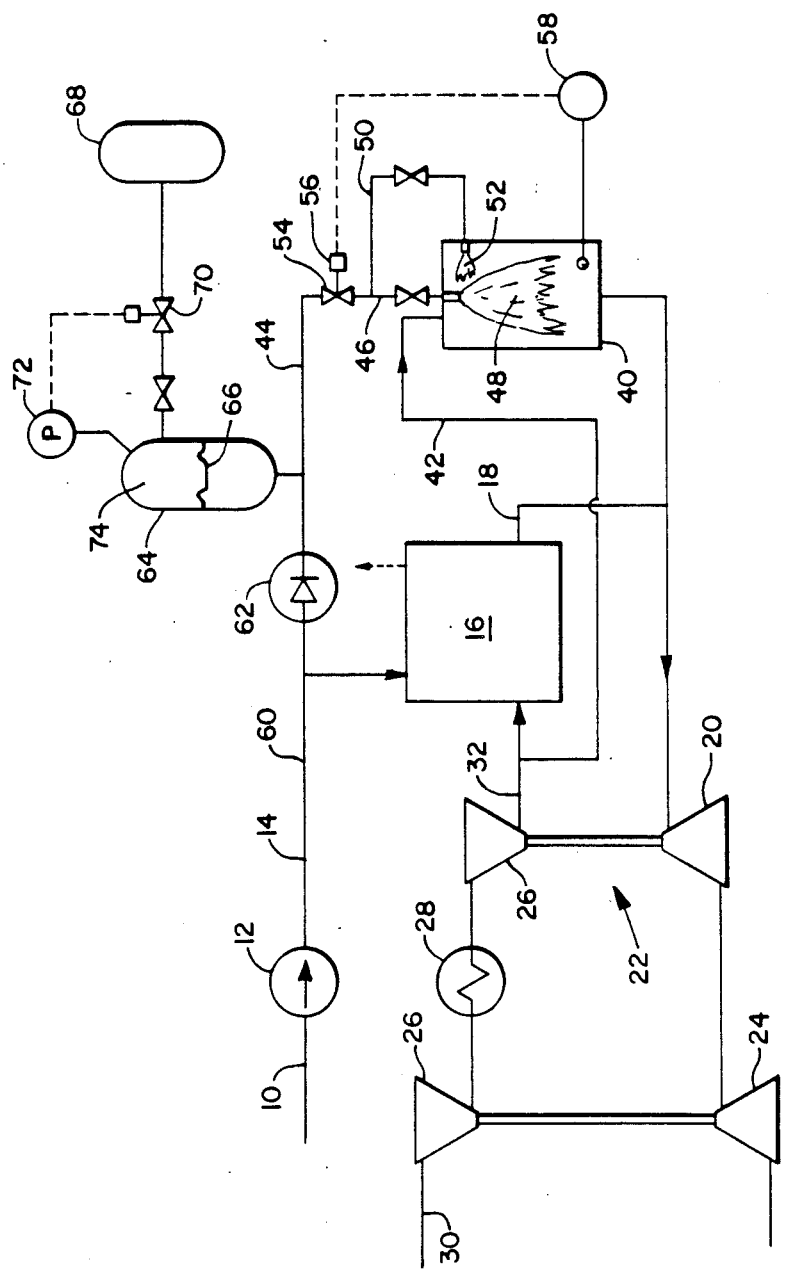

4,973,528

FUEL CELL GENERATING PLANT

TECHNICAL FIELD

The invention relates to a fuel cell generating plant and in particular to a fuel supply system for an auxiliary burner of such plant.

BACKGROUND OF THE INVENTION

Fuel cell systems conveniently operate at elevated pressures. Since the fuel cell system develops substantial heat, the turbo compressor arrangement is conveniently used. The compressor compresses the air feeding the components of the fuel cell system using the energy in the gas products leaving the fuel cell system at elevated pressure as well as high temperature as these exhaust products then pass through the turbine portion of the turbo compressor.

At certain loads on the system there may not be sufficient heat generated to operate the turbo compressor at the proper level. Accordingly, an auxiliary burner is supplied which receives air from the compressor and which fires fuel to supplement the energy from the fuel cell system.

Such an auxiliary burner uses a primary burner which is modulated as required to maintain appropriate compressor discharge pressure. It also includes a pilot which is burning continuously and assures ignition. For safety reasons such auxiliary burner also includes a flame sensor to detect the presence of flame. If the flame is extinguished for any reason, this fuel sensor sends a signal to a valve in the fuel supply to stop fuel to the auxiliary burner.

It is common for auxiliary power lines in plants to experience occasional intermittent voltage loss lasting 1 to 5 seconds, and occasional longer intermittent voltage loss lasting up to 15 seconds. These are related frequently to multiple tries at auxiliary power line breaker reclosure after certain conditions such as lightening strikes. Since the fuel is being compressed for a fuel cell power plant, such loss of power can result in a rapid loss of fuel pressure to the fuel cell and the auxiliary burner. The rapid decrease in fuel supply or complete loss of fuel to the auxiliary burner will result in a flameout which is sensed by the flame sensor cutting off fuel to the auxiliary burner.

Since combustibles may exist within the furnace chamber of the burner, it is not safe to immediately restart the burner, but the unit must first be purged and then restarted. This longer term outage of the auxiliary burner leads to a shutdown of the entire plant.

It therefore is advantageous to maintain operation of the auxiliary burner, or at least the pilot therein during these brief power losses.

SUMMARY OF THE INVENTION

In a fuel cell power plant having an auxiliary burner the fuel supply to the auxiliary burner is obtained from a takeoff point to the main fuel line. After this takeoff point there is located a check valve in the line to the auxiliary burner. A fuel accumulator is located between the check valve and the auxiliary burner, whereby a fuel may continue to be supplied to the auxiliary burner for a short time despite loss of the main fuel pressure. The check valve isolates the stored fuel in the accumulator from the fuel cell power plant so that the required capacity of the accumulator may be reasonable in size since it needs only supply auxiliary burner requirements.

BRIEF DESCRIPTION OF THE DRAWING

The FIGURE is a schematic illustration of a fuel cell power plant.

DESCRIPTION OF THE PREFERRED EMBODIMENT

A gaseous fuel from an outside line 10 is compressed by compressor 12 for delivery through a main fuel line 14 to fuel cell systems 16. This fuel cell system is massive including a hydrodesulfurizer, shift converters, heat exchangers, a gas reformer, and the fuel cells themselves. Hot exhaust from the fuel cell system passes through exhaust conduit 18 to turbine 20 of turbo compressor 22. The turbo compressor may be multiple stage with a second section 24 as illustrated.

These turbines drive air compressor 26 shown in two portions with an intercooler 28 in between. Atmospheric air from location 30 is introduced into the fuel cell through main air supply conduit 32 to support the fuel cell operations.

Since the energy from the fuel cell system in the gases passing exhaust conduit 18 is not always sufficient to operate the turbo compressor, an auxiliary burner 40 is supplied. Air supply for this burner is taken from the exhaust of compressor 22 and passes through conduit 42 to the auxiliary burner.

Fuel supply to the auxiliary burner passes to auxiliary burner conduit 44 where it is conveniently divided into a primary fuel conduit 46 for supplying the primary burner 48 and a pilot conduit 50 for supplying a pilot 52.

Emergency shutoff valve 54 operated by an actuator 56 is responsive to flame sensor 58. On loss of flame the flame sensor operates to immediately close valve 54 for safety reasons.

Between the pressurized fuel supply 60 located in conduit 14 and the burner 40 there is located a check valve 62. Between the check valve and the burner there is also located a gas accumulator 64. It can be seen that upon loss of pressure in conduit 14 the check valve 62 will prevent gas discharging from accumulator 64 from passing back into conduit 14 where it would be used by the fuel cell system 16.

This check valve and accumulator should be located to at least allow supply to the pilot 52. While it may be located on occasions in a location such as in line 50 to supply just the pilot, it is preferred to locate it as illustrated whereby the pilot as well as the primary burner 48 are supplied on loss of fuel pressure in conduit 14.

In the event of a temporary loss of power, the compressor 12 is temporarily lost and under pressure in line 14 rapidly decreases. From the accumulator 64, fuel below diaphragm 66 continues to be supplied to the pilot 52 in particular, and also to primary burner 48. Because of the massive nature of the fuel cell system 16 the turbo compressor system tends to operate for quite some time thereby continuing the supply of air through conduit 42 to the burner 40.

Increased utilization of the volume of accumulator 64 is accomplished by having a stored supply of highly compressed nitrogen 68 connected to accumulator 64 through control valve 70. Pressure regulator 72 operates to control the flow of the nitrogen or other inert gas into volume 74 within accumulator 64, this being on the opposite side of diaphragm 62 from the fuel. Accordingly, substantially the full volume of gas within the accumulator may be used during an emergency without loss of pressure.

I claim:

1. A fuel cell generating plant comprising:
   a compressed fuel supply;
   a fuel cell system including fuel conditioning apparatus and fuel cells;
   a main fuel conduit for conveying fuel from said fuel supply to said fuel cell system;
   a turbo compressor having a turbine receiving exhaust products from said fuel cell system and a compressor for compressing air;
   a main air conduit for conveying air from said compressor to said fuel cell system;
   an auxiliary burner having a primary burner and a pilot;
   an auxiliary air conduit for conveying air from said compressor to said auxiliary burner;
   an auxiliary fuel conduit for conveying fuel from said compressed fuel supply to said auxiliary burner;
   an auxiliary exhaust conduit for conveying exhaust products from said auxiliary burner to said turbine;
   a check valve located between said fuel supply and said pilot; and
   a gas accumulator in said auxiliary fuel conduit located between said check valve and said pilot.

2. A fuel cell generating plant as in claim 1:
   said check valve located in said auxiliary fuel conduit between said compressed fuel supply and said burner; and
   said gas accumulator located in said auxiliary fuel conduit between said fuel supply and said burner.

3. A fuel cell generating plant as in claim 2:
   a separation diaphragm in said accumulator, said fuel located on one side of said diaphragm and an inert gas located on a second side of said diaphragm;
   a store of stored compressed inert gas; and
   means for controllably introducing gas from said store of inert gas into said second side of said diaphragm.

* * * * *